(12) United States Patent
Johnson et al.

(10) Patent No.: US 7,436,622 B2
(45) Date of Patent: Oct. 14, 2008

(54) CONCURRENT SERVO AND DATA TRACK WRITING

(75) Inventors: Douglas W. Johnson, Stillwater, MN (US); Denis J. Langlois, River Falls, WI (US)

(73) Assignee: Imation Corp., Oakdale, MN (US)

( * ) Notice: Subject to any disclaimer, the term of this patent is extended or adjusted under 35 U.S.C. 154(b) by 36 days.

(21) Appl. No.: 11/497,185

(22) Filed: Jul. 31, 2006

(65) Prior Publication Data

US 2008/0024905 A1  Jan. 31, 2008

(51) Int. Cl.
*G11B 5/584* (2006.01)

(52) U.S. Cl. .................................... 360/77.12

(58) Field of Classification Search ........................ None
See application file for complete search history.

(56) References Cited

U.S. PATENT DOCUMENTS

| | | | |
|---|---|---|---|
| 5,689,384 A | 11/1997 | Albrecht et al. | |
| 5,805,372 A * | 9/1998 | Hoogendoorn et al. ... | 360/77.01 |
| 5,898,533 A * | 4/1999 | Mantey et al. ................ | 360/48 |
| 5,926,339 A * | 7/1999 | Mantey et al. ........... | 360/78.02 |
| 6,021,013 A | 2/2000 | Albrecht et al. | |
| 6,023,385 A | 2/2000 | Gillingham et al. | |
| 6,134,070 A * | 10/2000 | Tran et al. ..................... | 360/75 |
| 6,236,525 B1 * | 5/2001 | Cates et al. ................... | 360/51 |
| 6,239,932 B1 * | 5/2001 | Hoogendoorn ............... | 360/64 |
| 6,462,904 B1 | 10/2002 | Albrecht et al. | |
| 6,614,607 B1 * | 9/2003 | Rothermel et al. ............ | 360/48 |
| 6,819,528 B1 * | 11/2004 | Cates et al. .............. | 360/241.1 |
| 6,937,412 B1 * | 8/2005 | Gill et al. ...................... | 360/48 |
| 6,952,317 B2 | 10/2005 | Molstad et al. | |
| 7,095,583 B2 * | 8/2006 | Johnson et al. .......... | 360/77.12 |
| 2005/0099713 A1 | 5/2005 | Molstad et al. | |
| 2005/0099714 A1 | 5/2005 | Yip et al. | |
| 2005/0099715 A1 | 5/2005 | Yip et al. | |
| 2005/0152067 A1 | 7/2005 | Yip et al. | |
| 2006/0274446 A1 | 12/2006 | Johnson et al. | |
| 2007/0002487 A1 | 1/2007 | Langlois et al. | |

OTHER PUBLICATIONS

"Pulse Compression Recording," Dent III et al., *IEEE Transaction on Magnetics*, vol. MAG-12, No. 6, Nov. 1976, pp. 743-745.

* cited by examiner

*Primary Examiner*—K. Wong
(74) *Attorney, Agent, or Firm*—Eric D. Levinson

(57) ABSTRACT

The invention is directed to techniques for storing information on a linear data storage medium, such as magnetic tape. According to the invention, a write head array concurrently writes a plurality of data tracks and at least one servo track onto the magnetic tape. In this way, the servo track is integrated between the data tracks. The servo track may, for instance, be located in the middle of a data band, and may span a distance corresponding to two data tracks. By concurrently writing the servo track with the data tracks, track misregistration (TMR) can be reduced or eliminated during the write operation.

22 Claims, 7 Drawing Sheets

US 7,436,622 B2

CONCURRENT SERVO AND DATA TRACK WRITING

TECHNICAL FIELD

The invention relates to data storage media and, more particularly, servo patterns and servo techniques for linear data storage media such as magnetic tape.

BACKGROUND

Data storage media are commonly used for storage and retrieval of data, and come in many forms, such as magnetic tape, magnetic disks, optical tape, optical disks, holographic disks, cards or tape, and the like. Magnetic tape media remains economical for storing large amounts of data. For example, magnetic tape cartridges, or large spools of magnetic tape, are often used to back up data in large computing centers. Magnetic tape cartridges also find application in the backup of data stored on smaller computers such as desktop or notebook computers.

In magnetic tape, data is typically stored as magnetic signals that are magnetically recorded on the tape surface. The data recorded onto magnetic tape is typically organized along "data tracks," and transducer heads are positioned relative to the data tracks to write data to the tracks or read data from the tracks. A typical magnetic data storage tape includes several data tracks within a data band. Other types of linear media, such as optical tape, magneto-optic tape, holographic tape, and other tape media formats can also make use of data tracks.

Servo patterns refer to signals or other recorded marks on a data storage medium that are used for tracking purposes. The servo patterns are typically recorded on servo tracks of a linear tape medium in order to provide reference points relative to the data tracks. A servo controller interprets detected servo patterns and generates position error signals. The position error signals are then used to adjust the lateral distance of the transducer head relative to the data tracks so that the transducer head is properly positioned along the data tracks for effective reading and/or writing of the data to the data tracks.

In some types of magnetic tape, the servo patterns are stored in specialized bands on the medium, called "servo bands." The servo bands are separated from data bands, and may include several servo tracks within a given servo band. Magnetic tape often includes a plurality of servo bands, with data bands located between the servo bands.

SUMMARY

In general, the invention is directed to techniques for storing information on a data storage medium, such as magnetic tape. In accordance with the invention, a write head array concurrently writes a set of data tracks and at least one servo track onto the data storage medium. In this manner, a servo track can be formed concurrently with data tracks of a data band during write operations. The servo track may, for instance, be located in the middle of the data tracks in the data band, and may span a distance-corresponding to two or more data tracks. Two or more adjacent heads of a matrix write head array may be dedicated to servo writing within a data band. By concurrently writing the servo track with the data tracks, track misregistration (TMR) can be reduced or eliminated during the write operation. Linear tape motion (LTM) during the write operation is essentially embedded in the concurrently written servo track, and can therefore reflect a more exact location of the written data.

Furthermore, by forming the servo track concurrently with the data tracks within a data band, the servo pattern can be located in close proximity to the associated data tracks, which reduces TMR during read operations as well. The data storage medium can also include a factory written servo pattern, e.g., written during media manufacture. The factory written servo pattern can be used to acquire the proper position for writing the data and servo tracks concurrently, and may help reduce the width of guard bands between bands of data. In addition, the factory written servo pattern may also be used for coarse positioning during readout, while the servo pattern that is written concurrently with the data tracks may be used for fine positioning during readout.

In one embodiment, the invention provides a method comprising writing a set of data tracks on a linear data storage medium using an array of write heads, and writing a servo pattern on the storage medium concurrently with the set of data tracks using the array of write heads.

In another embodiment, the invention provides a linear data storage medium comprising a plurality of data tracks formed on the medium by an array of write heads, and a servo track formed within the plurality of data tracks, the servo track being formed by the array of write heads.

In another embodiment, the invention provides a head array for writing data and a servo pattern to a magnetic tape, the array comprising a set of adjacent write heads, and a controller to control the set of adjacent write heads to write the data to the magnetic tape and to concurrently write the servo pattern via one or more of the write heads.

The details of one or more embodiments of the invention are set forth in the accompanying drawings and the description below. Other features, objects, and advantages of the invention will be apparent from the description and drawings, and from the claims.

DETAILED DESCRIPTION

The invention is directed to servo patterns and techniques for recording such servo patterns onto linear data storage media, such as magnetic tape. In accordance with the invention, a magnetic tape (or other linear media) includes a servo pattern that is written by two or more adjacent write heads within a write head array, e.g., which may be similar or identical to the other write heads of the write head array that are used for writing tracks of data. Rather than write data tracks, however, two or more write heads of write head array are used to record a servo pattern. In this manner, a servo pattern is formed directly between data tracks, within a data band, during data write operations. In other words, two or more tracks within a data band are recorded with a servo pattern by write heads of a write head array. Consequently, a servo track is formed concurrently with data tracks during write operations by the write head array.

The described servo pattern is such that conventional factory servo writers are not needed, although a factory written pattern may be used in conjunction with the servo patterns described herein. In that case, a factory written servo pattern may provide coarse positioning functionality, while the servo pattern that is written concurrently with the data can provide fine positioning functionality. The servo pattern that is written concurrently with the data can significantly reduce track misalignment relative to conventional patterns that are written separately from the data. Since the servo track is formed concurrently with data tracks by heads that are part of a common array of write heads, the servo track is perfectly aligned with the data tracks. The described techniques may also allow for the elimination of one or more factory written servo bands, which can increase the surface area of the tape that is dedicated to data. More importantly, the techniques of this disclosure may allow for higher track density on magnetic tape. Each of these factors may help to increase the storage capacity of the magnetic tape, which is highly desirable.

Figure 1:
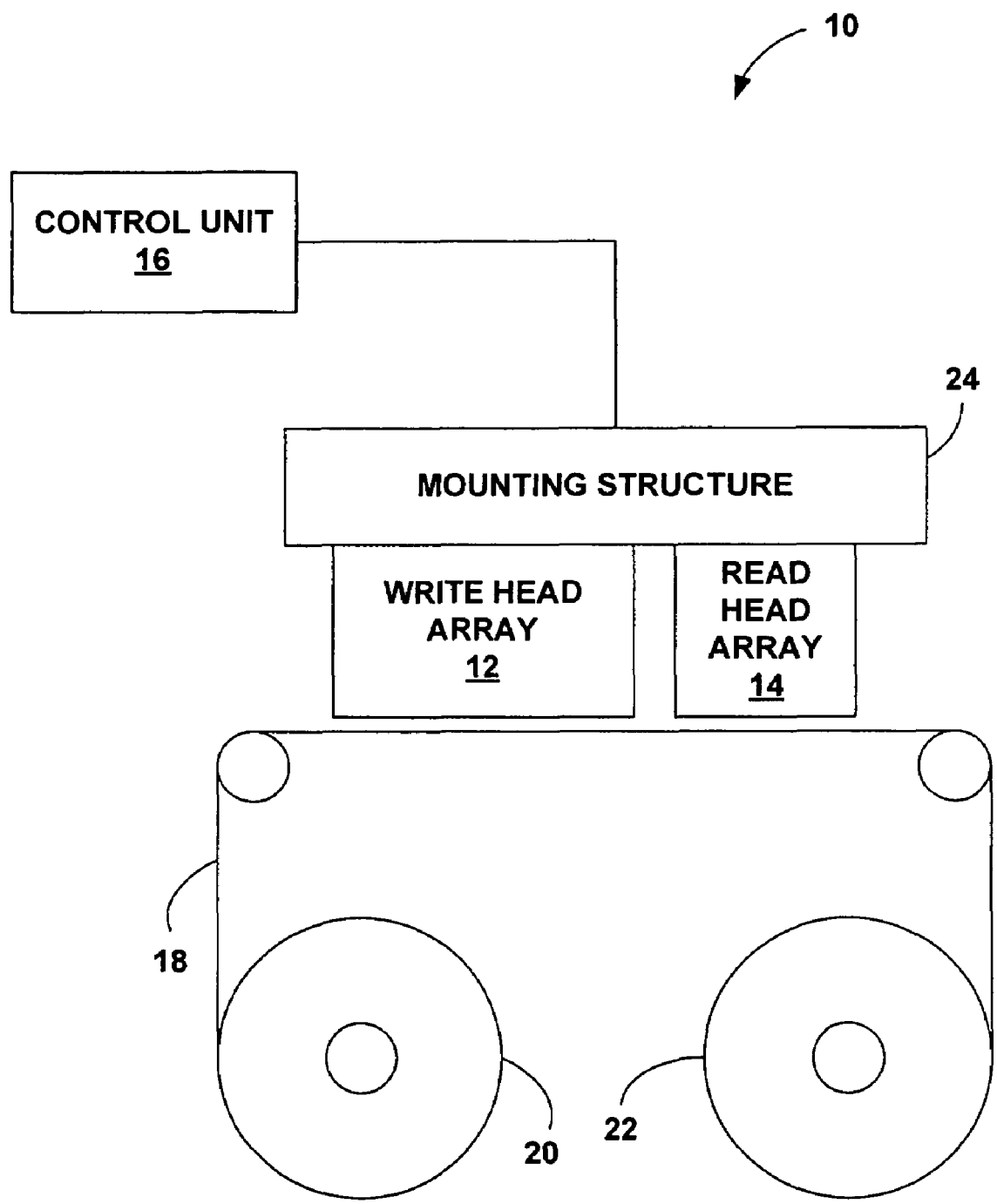
FIG. 1 is a schematic diagram illustrating a data storage tape drive that concurrently writes data tracks and one or more servo patterns.

FIG. 1 is a schematic diagram illustrating a data storage tape drive 10. Data storage tape drive 10 includes a write head array 12, a read head array 14, a control unit 16, and a magnetic tape 18 spooled on spools 20 and 22. Magnetic tape 18 feeds from spool 20 to spool 22, passing in close proximity to write head array 12. For example, magnetic tape 18 may pass in contact over write head array 12, or may fly over write head array 12 in a non-contact flyable manner. Magnetic tape 18 stores data that is written by write head array 12. Magnetic tape 18, for example, may comprise a polymer substrate coated with one or more layers of magnetic particles on one or both sides of the tape. Magnetic tape 18 may exhibit longitudinal or perpendicular magnetic anisotropy.

Write head array 12 includes a plurality of write heads that write information onto magnetic tape 18. As magnetic tape 18 is fed past write head array 12, the write heads of write head array 12 write information into a plurality of tracks of magnetic tape 18. In accordance with the techniques described herein, write head array 12 concurrently writes data tracks and at least one servo track onto magnetic tape 18. In this manner, write head array 12 integrates a servo track within the data tracks of a data band. By concurrently writing the servo track with the data tracks, track misregistration (TMR) can be reduced during the write operation. Moreover, by integrating the servo pattern of the servo track within a data band, the servo pattern can be located in closer proximity to the associated data tracks, thus reducing TMR associated with media dimension instability. Write head array 12 and read head array 14 may be similar to those described in copending and commonly assigned application Ser. No. 11/013,279, filed Dec. 14, 2004 for Yip et al., entitled "SYSTEM WITH MATRIX ARRAY OF WRITE HEADS AND MATRIX ARRAY OF MAGNETORESISTIVE (MR) READ," the entire content of which is incorporated herein by reference. Unlike the head arrays described in application Ser. No. 11/013,279, however, write head array 12 includes two or more write heads that define a servo pattern at the direction of control unit 16. Essentially, write head array 12 is unique insofar as two or more of the heads are used to write servo patterns, e.g., at the direction of control unit 16. Read head array 14 also differs from the read head arrays described in application Ser. No. 11/013,279 insofar as read head array 14 includes at least one servo read head to read the servo pattern written by some of the write heads.

Read head array 14 generally includes a plurality of read heads. Read head array 14 may, for example, include a plurality of magnetoresistive (MR) read heads for reading data and at least one servo read head for reading servo information. In this manner, read head array 14 reads data and servo information concurrently from magnetic tape 18. In one embodiment, write head array 12 and read head array 14 are mounted on a single mounting structure 24 in order to ensure that the channels of write head array 12 align with the channels of read head array 14. Alternatively, write head array 12 and read head array 14 may be mounted on separate mounting structures, and may use separate actuators for head positioning. Separate actuators may be used with a write head array and a read head array located on each actuator for bi-directional writing and reading, in which case the write head array associated with the first actuator would be used with the read head array of the other actuator for read-after-write verification.

Control unit 16 controls the data that is written by write head array 12, and performs corresponding read back of such data via read head array 14 in order to verify that the data was written correctly. Moreover, control unit 16 also controls the servo writing and servo control. In particular, control unit 16 controls most of the write heads of array 12 to write data, but controls one or more of the write heads of array to write a servo pattern concurrently with the data.

Control unit 16 also controls the feedback positioning write head array 12 and read head array 14 on tape 18 during the writing and reading, respectively. During a data write operation, for example, control unit 16 may utilize a factory written servo pattern to position write head array 12 for writing data onto tape 18. Also, during a data read operation, control unit 16 may utilize the factory written servo pattern to acquire the proper data band, but can further fine tune the position of read head array 14 using the servo pattern that was written with the data tracks during the write operation. The integrated servo track is in perfect registration with the data insofar as the different heads of write head array 14 are used to record the data and the servo track. Therefore, TMR can be significantly reduced by the invention.

The techniques described in this disclosure are described in the context of tape drives for exemplary purposes. The techniques may be utilized by other data storage media that use servo patterns to position read and write heads on the storage medium. The techniques are most applicable to any so-called linear media, that include data and servo tracks. Optical tape, holographic tape, and magneto-optic tape are a few other examples of media that may benefit from the teaching herein.

Figure 2:
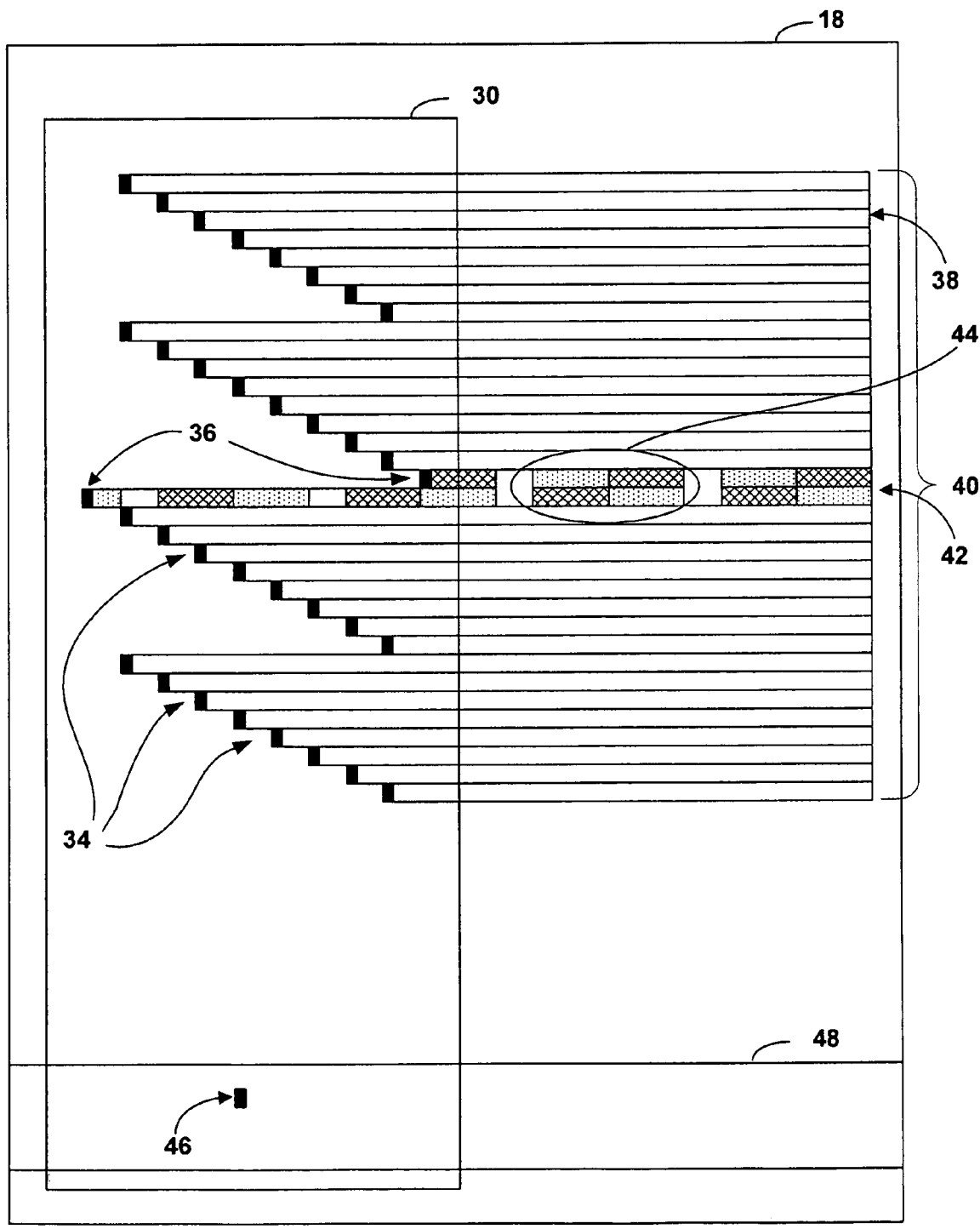
FIG. 2 is a schematic diagram illustrating a top view of an exemplary write head array applied to a portion of a magnetic tape.

FIG. 2 is a schematic diagram illustrating a top view of an exemplary write head array 30 applied to a portion of a magnetic tape 18. Write head array 30 may, for example, be write head array 12 of FIG. 1.

Write head array 30 includes a plurality of write heads. In particular, write head array 30 includes data write heads 34 and servo write heads 36. Data write heads 34 write data tracks, such as data track 38, onto magnetic tape 18. Each of the data write heads 34 writes a separate data track. The plurality of data tracks form a data band 40.

Servo write heads 36 write a servo pattern 42 onto magnetic tape 18. In the embodiment illustrated in FIG. 2, servo write heads 36 writes servo pattern 42 in the form of a servo track, such that it is formed within data band 40 in a manner parallel to the data tracks. Alternatively, servo write heads 36 may write servo patterns, e.g., on the outermost edge of data band 40. In either case, data write heads 34 and servo write heads 36 write the data tracks and servo pattern 42 concurrently. In the illustrated example, two head channels that would otherwise correspond to two different data tracks are used to define one servo track that includes pattern 42 defined by the two channels. Thus, servo pattern 42 may be perfectly adjacent the data tracks of data band 40 such that servo pattern essentially touches two data tracks on either side of servo pattern 42 without a guard band between the data tracks and the servo pattern.

Data write heads 34 and servo write heads 36 may be generally identical in structure, but differ in terms of the information that is written. A controller may be used to define such information. Data write heads 34 may write magnetic transitions that represent data in conformance with a magnetic tape data format. Servo write heads 36, however, do not write such conventional data. Instead, servo write heads 36 are controlled to define a servo pattern.

Data write heads 34 and servo write heads 36 may be arranged in a two-dimensional matrix to allow the write heads to write information at relatively narrow track widths. In the example illustrated in FIG. 2, write head array 30 includes thirty-two data write heads 34 and two servo write heads 36. Each of the thirty-two write heads may write a respective data track that is adjacent other tracks, while both of servo write heads 36 may be used to write one servo track that is adjacent data tracks. In any case, although thirty-two data write heads 34 and two servo write heads 36 are illustrated, write head array 30 may include any number of data write heads and servo write heads. The write heads of write head array 30 are arranged in a two-dimensional matrix for exemplary purposes only. The write heads of write head array 30 may be arranged in other configurations.

Servo write heads 36 are located in the middle of the data write heads 34 of write head array 30. Therefore, in the example of FIG. 2, servo pattern 42 is formed in the center of the data band 40. Alternatively, servo write heads 36 may be located elsewhere within the write head array 30. For example, servo write heads 36 may be located on one side of the data band 40 to write the servo pattern on the outermost edge of the data band 40. Put another way, any two adjacent heads of array 30 may be used to define a servo pattern within a data band. Generally, write head array 30 includes a first subset of write heads that write data and a second subset of write heads (i.e., servo write heads 36) that write the servo pattern.

Moreover, write head array 30 may include additional servo write heads 36 to write additional servo patterns interspersed within the data band 40. In one example, write head array 30 may include servo write heads on both edges of data band 40. In this manner, write head array 30 may write a servo pattern adjacent to each edge of data band 40. This can provide redundancy in servo tracking. However, one servo pattern in the middle of the data band, as illustrated, should be sufficient. Moreover, by forming the servo pattern in the middle of the data band, problems associated with dimensional instability of the magnetic tape can be reduced insofar as the servo pattern is located as close as possible to any given data track. On the other hand, if servo write heads are positioned on both edges of data band 40, this may provide an additional advantage of allowing for dynamic calculation of head azimuth during the read operation, which could possibly be used to adjust rotational positioning of a read head array and thereby improve head alignment with the tracks.

Servo pattern 40 may include sets of mixed frequency amplitude-based servo windows 44. The sets of mixed frequency amplitude-based servo windows include a set of first servo windows recorded at a first frequency and a set of second servo windows recorded at a second frequency. Additional discussion of one such exemplary servo pattern is described in greater detail below, with respect to FIGS. 6 and 7A-7C. Moreover, further details of such a servo pattern are discussed in co-pending and commonly assigned application Ser. No. 11/171,958, filed Jun. 29, 2005 for Langlois et al., entitled "MIXED FREQUENCY AMPLITUDE-BASED SERVO PATTERN," the entire content of which is incorporated herein by reference. As illustrated in FIG. 2, the sets of mixed frequency servo windows 44 repeat to define successive servo frames along the length of magnetic tape 18. Alternatively, however, the servo pattern integrated within data band 40 may be a different type of servo pattern.

Write head array 30 may also include a separate servo read head 46. In this case, servo read head 46 may be used to read and track a pre-written factory servo pattern 48 on magnetic tape 18. A control unit (not shown in FIG. 2) may use the servo information read by servo read head 46 to position write head array 30. For example, the control unit may determine an initial position of write head array 30 relative to factory servo pattern 48 based on data read by servo read head 46, calculate a distance between the initial position of write head array 30 and a desired location of write head array 30, and move write head array 30 based on the calculated distance to the desired position. Once written, however, servo pattern 42 provides improved accuracy relative to pre-written factory servo pattern 48, and is more aligned with the data bands insofar as the same array 30 is used to define the data tracks of band 40 and servo pattern 42.

Alternatively, write head array 30 may not include a separate servo read head. In that case, write head array 30 would not use a factory servo pattern to align itself with respect to magnetic tape. Instead, in that case, write head array 30 would write data tracks of band 40 and servo pattern 42 within band 40 using open-loop writing techniques. Subsequent read techniques, however, would make use of closed-loop feedback based on servo pattern 42. If open loop writing techniques are used, larger guard bands between the adjacent data bands may be needed to ensure that data overlap does not occur. Guard bands, however, are undesirable wasted areas where no data is written.

Write head array 30 may be used to write subsequent data bands across a full width of magnetic tape. In other words, write head array 30 may write numerous data bands similar to band 40, each of which includes an integrated servo pattern therein, according to this disclosure.

Figure 3:
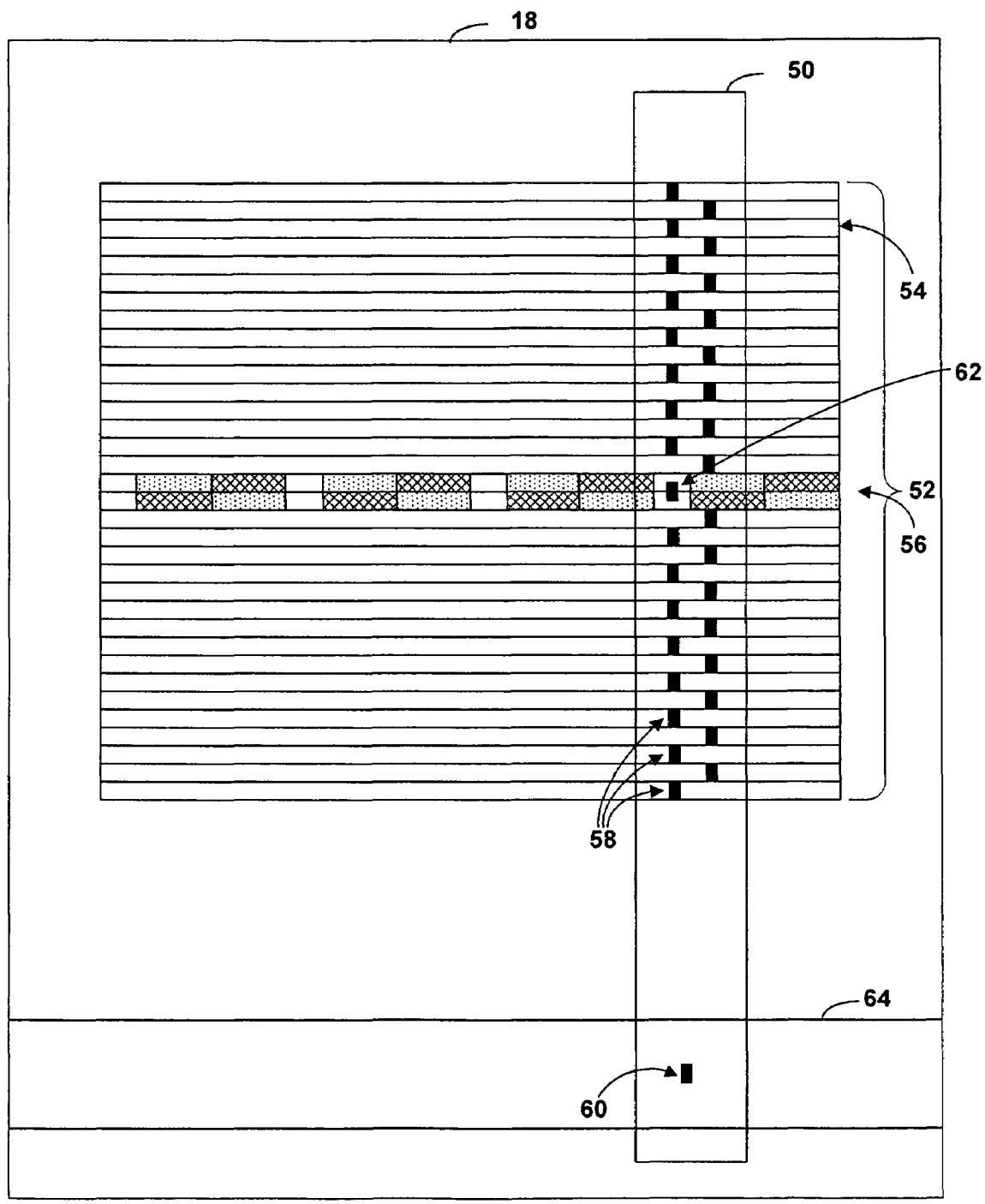
FIG. 3 is a schematic diagram illustrating a top view of an exemplary read head array applied to a portion of a magnetic tape.

FIG. 3 is a schematic diagram illustrating a top view of an exemplary read head array 50 applied to a portion of a magnetic tape 18. Magnetic tape 18 includes a plurality of data bands, such as data band 52. Read head array 50 may correspond to array 14 illustrated in FIG. 1, and may be used to read data form magnetic tape 18 or to verify data as it is written. Each of the recorded data bands include a plurality of data tracks (such as data track 54) and at least one servo pattern (such as servo pattern 56) formed within data band 52. The data bands may be formed, for example, in accordance with the techniques described above.

In the example illustrated in FIG. 3, data band 52 includes thirty-two data tracks 54 and one servo pattern 56. Data band 52 may, however, include any number of data tracks and may also include more than one servo pattern, if desired. Servo pattern 56 comprises a mixed frequency amplitude-based signal, as outlined below with respect to FIGS. 6 and 7A-7C, although the invention is not necessarily limited in this respect.

Read head array 50 includes a plurality of read heads, including data read heads 58 and servo read heads 60 and 62. Servo read head 60 is optional, but could be useful since a factory written pattern is typically present anyway to position the heads use during the write operations. Data read heads 58 read data from data tracks of data band 52. Each one of data read heads 58 is associated with a channel of read head array 50, with each channel corresponding to a unique one of data tracks on magnetic tape 18. Thus, read head array 50 can simultaneously read information stored in the different data tracks of magnetic tape 18. In some cases, read head array 50 reads out pre-recorded data. In other cases, read head array 50 may read and verify information as it is recorded by a write head array, such as write head array 12 of FIG. 1.

Servo read heads 60 and 62 read and track servo patterns on magnetic tape 18. Particularly, servo read head 60 reads and tracks a prewritten factory servo 64, and servo read head 62 reads and tracks integrated servo pattern 56. Servo read heads 60 and 62 and data read heads 58 are in a two-dimensional matrix on read head array 50 in order to operate at relatively narrow track widths. Again, additional details of an exemplary two-dimensional read head are provided in co-pending and commonly assigned application number application Ser. No. 11/013,279, incorporated by reference above. Accordingly, the invention can facilitate increased storage densities on magnetic media, and is particularly useful for increasing the storage densities of magnetic tape. The read heads of read head array 50 may, however, be arranged in other configurations, such as a linear array of read heads.

A control unit, such as control unit 16 of FIG. 1, determines an initial position of read head array 50 based on data read by servo read head 60. The control unit then calculates a distance between the initial position of read head array 50 and a desired location of read head array 50. The control unit moves read head array 50 based on the calculated distance to the desired position. In this manner, the control unit coarsely adjusts read head array 50 using the prewritten factory servo pattern 64.

The control unit further adjusts read head array 50 using servo pattern 56, which is formed between data tracks of a data band. Because the servo band 56 is in perfect registration with the data tracks, TMR can be reduced during such read-out.

As shown in FIG. 3, read head 62 is located half way between the two corresponding channels that define the servo pattern 56. In other words, relative to write head elements 36 in write head array 30, which may be used to write servo pattern 56, the servo read element 62 is positioned half way between such write elements. In other words, any two channels of a write head array that define a servo pattern should have a corresponding servo read element of a read head array that aligns half-way between the two channels. The other read elements, however, perfectly align to the other data tracks when the servo read element 62 is aligned along servo pattern 56, half way between the two tracks that form the servo pattern. Servo pattern 56 can be viewed as one servo track, or as two tracks that define a servo pattern.

Figure 4:
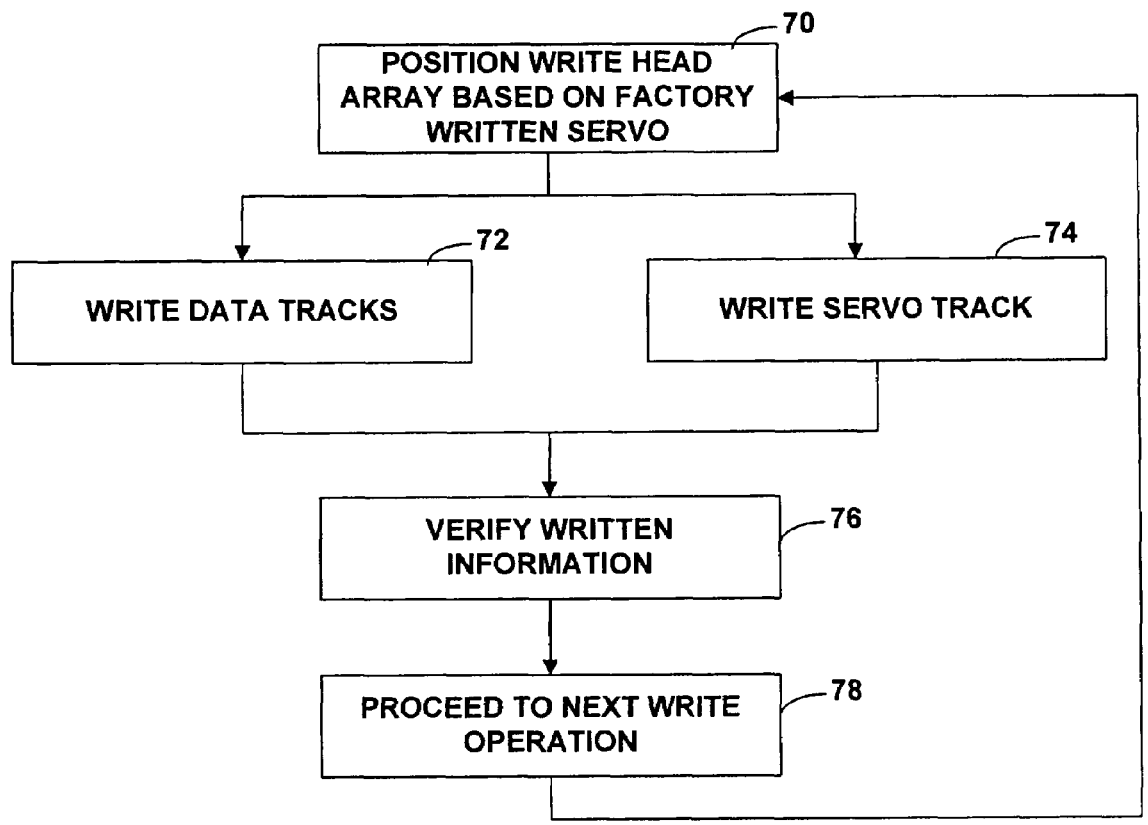
FIG. 4 is a flow diagram illustrating exemplary operation of a data storage tape drive concurrently writing data tracks and one or more servo patterns.

FIG. 4 is a flow diagram illustrating exemplary operation of a data storage tape drive, such as tape drive 10 of FIG. 1, concurrently writing data tracks and one or more servo tracks. Initially, a control unit positions a write head array, such as either of write head arrays 12 or 30, to a correct position based on a factory written servo (70). In this manner, the factory written servo may allow for good initial positioning of the write head array, and allow for reduction in guard bands, which typically hold no data, between data bands. Alternatively, however, the control unit could position the write head array using open-loop techniques, which would typically require larger guard bands.

After control unit positions the write head array, the write head array concurrently writes one or more data tracks (72) as well as a servo track (74). The servo track may be written by two adjacent channels of the write head array, which are controlled to define a servo signal rather than conventional data. The servo track runs along with the data tracks substantially the length of the tape, and is generally parallel to the data tracks. The servo track is written concurrently with the data tracks and can be formed within a data band. In other words, the servo track (i.e., the servo pattern defined by two adjacent channels of the head) may be written between the data tracks of the data band. Alternatively, the servo pattern may be written adjacent an outer edge of the band, or possibly on both sides of the band. If desired, more than one servo pattern may be formed within the band to provide redundancy should one of the bands be corrupted.

A read head array may check the written information to ensure that the information was correctly written (76). If the information is correctly written, the control unit proceeds to the next write operation (78). If the information is not correctly written, the control unit may try to rewrite the data tracks, and in doing so, may also write the same servo pattern with the re-written data.

Figure 5:
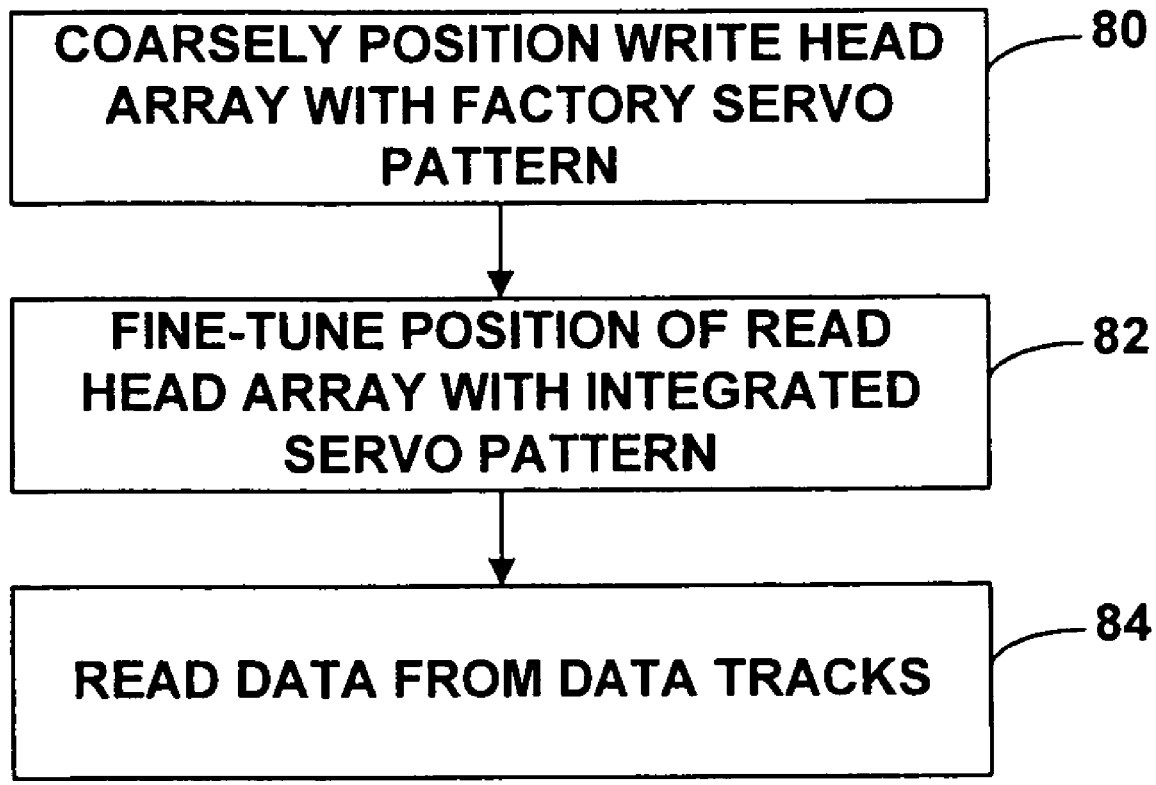
FIG. 5 is a flow diagram illustrating exemplary operation of a data storage tape drive reading data from a data band with an integrated servo pattern.

FIG. 5 is a flow diagram illustrating exemplary operation of a data storage tape drive reading data from a data band with an integrated servo pattern. Initially, a control unit coarsely positions a read head array, such as read head array 50 of FIG. 3, using a pre-written factory servo pattern (80). The control unit may, for example, determine an initial position of the read head array based on data read by a servo read head that tracks the factory servo pattern, calculate a distance between the initial position of the read head array and a desired location, and move the read head array to the desired position. Alternatively, the proper initial position of the read head array could be acquired by using the different heads of read head array to read and acquire the servo signals that are written concurrently with the data. In this case, a separate servo head to read the factory servo could be eliminated from the read head structure.

In either case, the control unit then fine-tunes the position of the read head array using the integrated servo pattern, i.e., the servo track formed between data tracks of a data band (82). In particular, the control unit moves read head array 50 using servo information read from integrated servo pattern 56 in a closed-loop fashion. Because the servo track is in perfect registration with the data tracks the amount of TMR is reduced.

As the control unit positions the read head array using both the factory servo pattern and the integrated servo pattern, the read head array reads the data from the data tracks (84). Even if the data tracks meander on the surface of the tape, the servo pattern will meander in a similar way insofar as the servo pattern is written at the same time as the data tracks using the same write head array. Thus, positional accuracy is not undermined even of the tracks meander over the surface of the tape.

Figure 6:
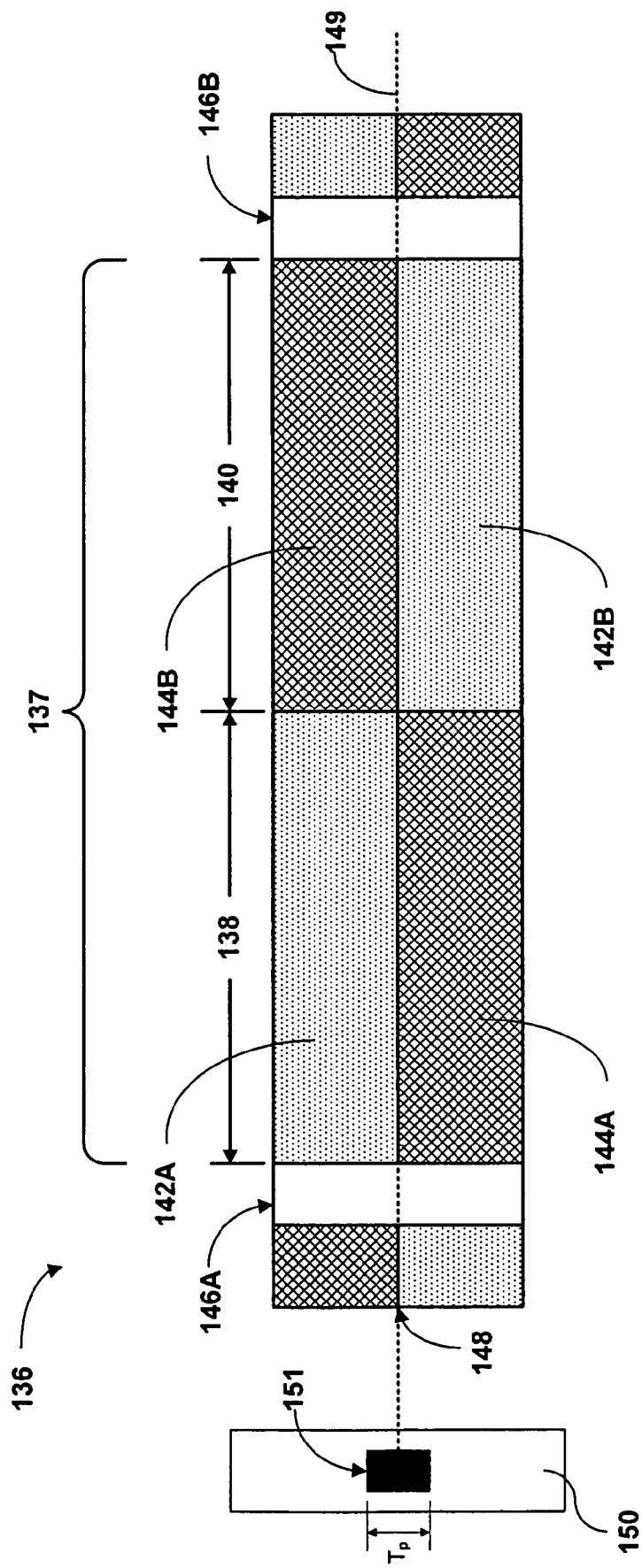
FIG. 6 is a depiction of a servo track portion of a magnetic tape relative to a servo read head.

FIG. 6 is a depiction of a servo track portion of a magnetic tape 136 relative to a servo read device 150 including a servo read head 151. Magnetic tape 136 includes a servo frame 137 recorded with a mixed-frequency amplitude-based servo pattern, which is one example of a servo pattern that can be written by an array of write heads during data writing operations. The servo pattern illustrated in FIG. 6 includes a set of first servo windows recorded at a first frequency 142A and 142B ("first servo windows 142") and a set of second servo windows recorded at a second frequency 144A and 144B ("second servo windows 144"). The set of first servo windows 142 and the set of second servo windows 144 are arranged in a checkerboard-like pattern. The different frequencies of the servo windows 142, 144 in servo frame 137 provide built-in PES redundancy.

In the illustrated embodiment of FIG. 6, magnetic tape 136 includes only one servo track 148 that defines a centerline 149. Again, servo track 148 may actually be written by two adjacent channels, which would correspond to two data tracks. Servo frame 137 includes a first portion 138 and a second portion 140. Within first portion 138 of servo frame 137, first servo window 142A is positioned above centerline 149 and second servo window 144A is positioned below centerline 149. Within second portion 140 of servo frame 137, first servo window 142B is positioned below centerline 149 and second servo window 144B is positioned above centerline 149. Servo track 148 resides a known distance from one or more data tracks (not shown in FIG. 6) within the same band of data.

Servo track 148 includes a plurality of servo frames (not shown) that may be separated by synchronization (sync) regions. As shown in FIG. 3, sync regions 146A and 146B ("sync regions 146") separate servo frame 137 from other servo frames along servo track 148. Servo track 148 includes sync region 146A before servo frame 137 to indicate a beginning of servo frame 137. Sync regions 146 may comprise unrecorded windows, or windows recorded at a third frequency. In some cases, the different widths of sync windows 146 can be varied to encode a digital word over the plurality of servo frames. For example, sync windows 146 may encode linear positioning (LPOS) information of magnetic tape 136. Sync regions 146, however, are generally optional according to the teaching of this disclosure.

First and second servo windows 142 and 144 may form a checkerboard-like configuration that enables servo read head 151 to pinpoint the location of track 148. In accordance with the invention, the first and second servo windows 142 and 144 positioned above and below centerline 149 have a common width. The first frequency and the second frequency may be substantially different and may be selected to not have common harmonics. For example, the first frequency may be approximately 1.2 MHz and the second frequency may be approximately 2.0 MHz.

In operation, as magnetic tape 136 passes by servo read head 151 (e.g., of a read-head array). Servo read head 151 can be positioned over servo track 148, in which case, the magnetic signal detected by servo head 151 can identify the location of servo head 151 relative to centerline 149. As servo head 151 moves over the set of first servo windows 142 and the set of second servo windows 144 along centerline 149, servo read head 151 detects a mixed frequency servo signal. The detected signal amplitude peaks remain at 100 percent regardless of the position of servo head 151 relative to centerline 149. The detected mixed frequency servo signal can also be filtered to generate a first frequency servo signal and a second frequency servo signal. Variations in the first frequency servo signal and the second frequency servo signal can identify the location of servo head 151 relative to centerline 149.

When the mixed frequency servo signal is constant and does not contain signal dropouts, both the first PES and the second PES adjust positioning of a servo read head 151 in the same direction. In other words, the two position error signals will generate redundant positioning information for the servo head 151. In the case where the mixed frequency servo signal does includes signal dropouts, the first PES and the second PES diverge, but their magnitudes are equal such that the dropout does not affect an average of the position error signals.

If the amplitude of the first frequency servo signal is not approximately equal to the amplitude of the second frequency servo signal, then servo read device 150 can be moved to better position servo read head 151 over centerline 149. In this manner, centerline 149 of servo track 148 can be located. Corresponding data tracks (not shown) are located at defined displacements from centerline 149 of servo track 148. Specifically, a full set of data tracks may immediately surround servo track 148 as described above.

Figure 7A:
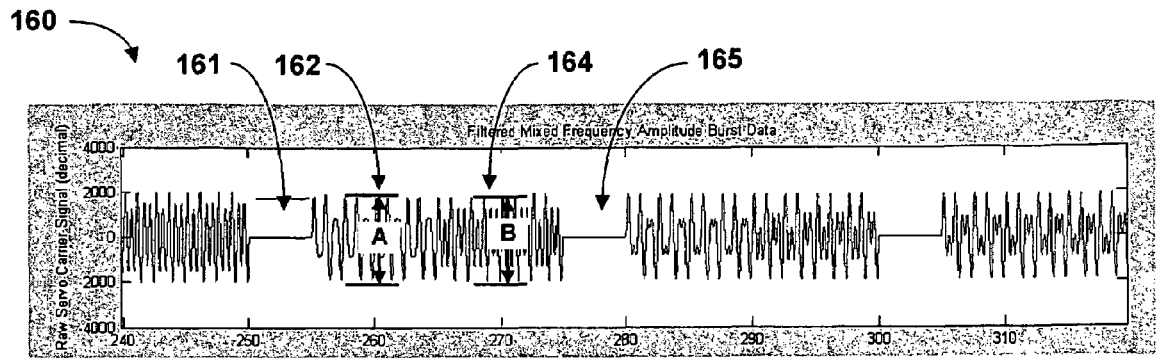
FIGS. 7A-7C illustrate exemplary output signals corresponding to FIG. 6.
Figure 7B:
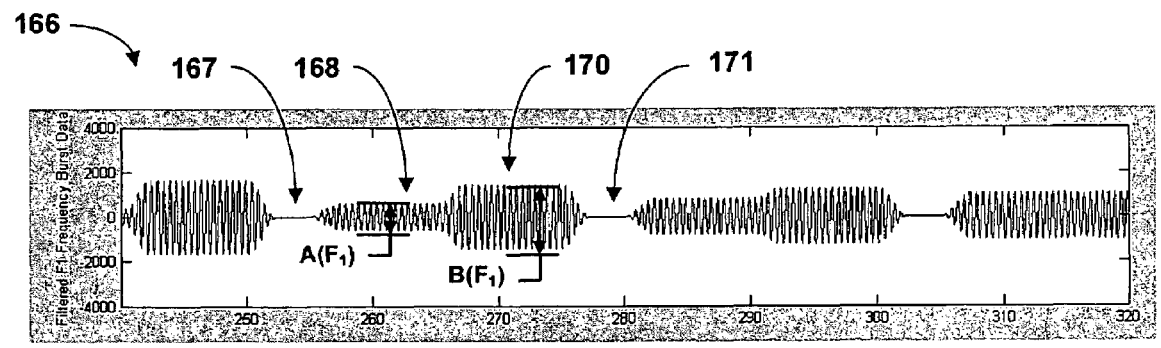
Figure 7C:
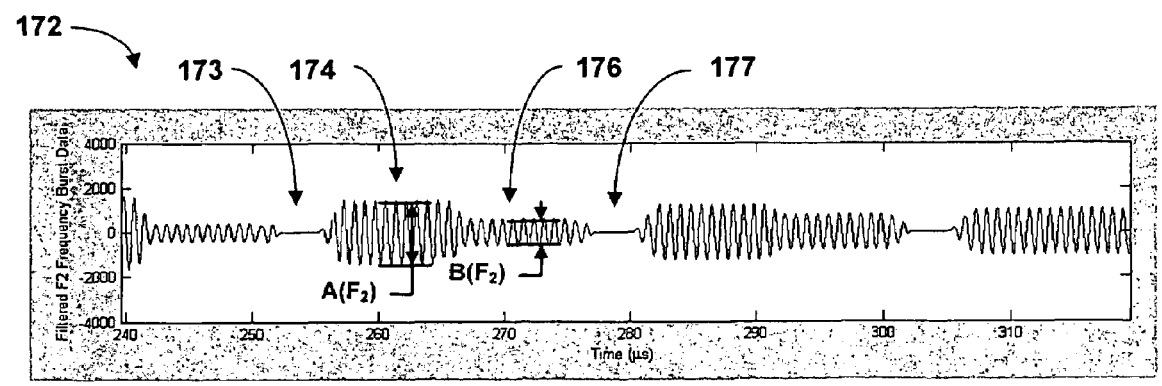

FIGS. 7A-7C illustrate exemplary output signals corresponding to FIG. 6. In particular, FIG. 7A illustrates mixed frequency servo signal 160 associated with servo read head 151 passing over servo track 148 along centerline 149. FIG. 7B illustrates first frequency servo signal 166 generated by filtering the first frequency from mixed frequency servo signal 160. FIG. 7C illustrates second frequency servo signal 172 generated by filtering the second frequency from mixed frequency servo signal 160. First frequency servo signal 166 and second frequency servo signal 172 extracted from mixed frequency servo signal 160 provide PES redundancy. A control unit (such as unit 16 of FIG. 1) may perform such closed loop position error servo tracking based on a mixed signal servo pattern.

In general, variations in the amplitude of first frequency servo signal 166 and second frequency servo signal 172 can be used to identify whether servo head 151 is on-track. A servo controller coupled to servo read device 150 may generate an overall PES based on the amplitude variations of first frequency servo signal 166 and second frequency servo signal 172 and move servo read device 150 to properly align servo read head 151 with servo track 148.

As servo head 151 (which may correspond to head 62 of FIG. 3) passes along centerline 149, the set of first servo windows 142 and the set of second servo windows 144 always provide a full amplitude response in signal 160, shown in FIG. 7A. Mixed frequency servo signal 160 includes a first burst 162 that corresponds to first portion 138 of servo frame 137 and a second burst 164 that corresponds to second portion 140 of servo frame 137. The amplitude of signal 160 falls by 100 percent at locations 161 and 165 corresponding to sync regions 146A and 146B, which are optional. If used, the reduced amplitude associated with sync regions can indicate a beginning of a servo frame to the servo controller.

As described above, first burst 162(A) corresponds to first region 138 of servo frame 137 in which first servo window 142A is positioned above centerline 149 and second servo window 144A is positioned below centerline 149. Second burst 164(B) corresponds to second region 140 of servo frame 137 in which first servo window 142B is positioned below centerline 149 and second servo window 144B is positioned above centerline 149.

The servo controller filters the first frequency from mixed frequency servo signal 160 and generates first frequency servo signal 166. The servo controller includes a first filter tuned to substantially eliminate the second frequency from the mixed frequency servo signal 160. In some cases, the first filter is tuned to have a peak at the first frequency and to have a null at the second frequency. In this way, first frequency servo signal 166 includes only signals generated from the set of first servo windows 142.

As shown in FIG. 7B, the amplitude of first frequency servo signal 166 reduces to an amplitude ($A(F_1)$) at location 168 corresponding to servo head 151 passing partially over first servo window 142A in first portion 138 of servo frame 137. The amplitude of first frequency servo signal 166 reduces to an amplitude (B($F_1$)) at location 170 corresponding to servo head 151 passing partially over first servo window 142B in second portion 140 of servo frame 137. The amplitude of signal 66 falls by 100 percent at locations 167 and 171 corresponding to sync regions 146A and 146B. When servo head 151 passes over sync region 146, servo head 151 detects a synchronization signal that indicates a beginning of a servo frame.

Amplitudes A($F_1$) and B($F_1$) indicate the position of servo head 151 relative to centerline 149. For example, a fall in the amplitude of signal 166 that is approximately equal at both locations 168 and 170 would indicate on-track positioning of servo head 151. If amplitude A($F_1$) was smaller than amplitude B($F_1$), as shown in FIG. 7B, servo head 151 may be positioned slightly below centerline 149. A first PES ($PES_1$) may be calculated from first frequency servo signal 166 based on a track pitch ($T_p$) of servo read head 151 and amplitudes A($F_1$) and B($F_1$).

$$PES_1 = \left(\frac{A(F_1) - B(F_1)}{A(F_1) + B(F_1)}\right)\frac{T_p}{2} \quad (3)$$

The first PES provides positioning information relative to centerline 149 that may cause movement of servo head 151 to positions that ensure amplitudes A($F_1$) and B($F_2$) correspond to approximately equal falls in the amplitude of signal 166, which indicates on-track positioning. On track positioning with respect to the servo track may also ensure on-track positioning with respect to the corresponding data tracks in that band insofar as the data read heads are properly aligned with the servo read head.

The servo controller also filters the second frequency from mixed frequency servo signal 160 and generates second frequency servo signal 172. The servo controller may include a second filter tuned to substantially eliminate the first frequency from the mixed frequency servo signal 160. In some cases, the second filter is tuned to have a peak at the second frequency and to have a null at the first frequency. In this way, second frequency servo signal 172 includes only signals generated from the set of second servo windows 144.

As shown in FIG. 7C, the amplitude of second frequency servo signal 172 reduces to an amplitude (A($F_2$)) at location 174 corresponding to servo head 151 passing partially over second servo window 144A in first portion 138 of servo frame 137. The amplitude of second frequency servo signal 172 reduces to an amplitude (B($F_2$)) at location 176 corresponding to servo head 151 passing partially over second servo window 144B in second portion 140 of servo frame 137. The amplitude of signal 172 falls by 100 percent at locations 173 and 177 corresponding to sync regions 146A and 146B.

Amplitudes A($F_2$) and B($F_2$) indicate the position of servo head 151 relative to centerline 149. For example, a fall in the amplitude of signal 172 that is approximately equal at both locations 174 and 176 would indicate on-track positioning of servo head 151. If amplitude A($F_2$) was larger than amplitude B($F_2$), as shown in FIG. 7C, servo head 151 may be positioned slightly below centerline 149. A second PES ($PES_2$) may be calculated from second frequency servo signal 172 based on a track pitch ($T_p$) of servo read head 151 and amplitudes A($F_2$) and B($F_2$).

$$PES_2 = -\left(\frac{A(F_2) - B(F_2)}{A(F_2) + B(F_2)}\right)\frac{T_p}{2} \quad (4)$$

The second PES provides positioning information relative to centerline 149 that may cause movement of servo head 151 to positions that ensure amplitudes A($F_2$) and B($F_2$) correspond to approximately equal falls in the amplitude of signal 172, which indicates on-track positioning. The second PES is 180 degrees complementary to the first PES given in equation (3).

When the mixed frequency servo signal is constant, as shown in FIG. 7A, both the first PES and the second PES adjust positioning of a servo read head 151 in the same direction. In other words, when the mixed frequency servo signal does not contain signal dropouts, the two position error signals will generate redundant positioning information for the servo head 151. In the case where the mixed frequency servo signal does includes signal dropouts, the first PES and the second PES diverge, but their magnitudes are equal such that the dropout does not affect an average of the position error signals.

The first PES and the second PES can be averaged to calculate an overall PES. Averaging the out-of-phase position error signals substantially minimizes error. Dropout or other signal errors in mixed frequency servo signal 160 are substantially eliminated in the overall PES. Since servo signal 160 comprises a full amplitude signal, a dropout error cannot be assumed to be part of the output servo signal. For example, a dropout error may cause a loss of signal in first frequency servo signal 166 and a commensurate loss of signal in second frequency servo signal 172. When the first and second position error signals are averaged, the dropout error is minimized such that an overall PES may be calculated even though a portion of servo signal 160 is lost. In addition, the full amplitude mixed frequency servo signal improves SNR. Combining an anti-aliasing filter and band-pass filters provides good noise reduction for evaluating the burst fields of the mixed frequency servo signal.

In some conventional servo patterns, a single tone frequency may be written with a similar servo write head configuration and have unerased windows. However, in the areas where the single tone frequency is written across the servo track, aligning the carrier phase between the two writer gaps may be very difficult. Misalignment of the phases can cause signal cancellations, addition of the resulting carrier signal, or amplitude modulation (AM). When accounting for other disturbances, such as speed jitter, these affects may be especially pronounced. By writing different frequencies, as described herein, the carrier phases are of no importance.

As an added embodiment, the servo pattern written concurrently with the data tracks may be written to include other data within the servo pattern. For example, referring again to FIG. 6, the frequencies used for servo windows 142 and 144 may be modulated to include additional information. An example of useful additional information that could be modulated in the frequencies of servo windows 142 and 144 is information indicative to the track location associated with that servo track and/or the various data tracks surrounding that servo track. Another example is linear positioning (LPOS) information.

Various embodiments of the invention have been described. Specifically, servo patterns and techniques for recording such servo patterns onto linear data storage media have been described in which two or more write heads of a write head array are used to record a servo track such that the servo track is formed directly between data tracks, within a data band. In other words, two or more tracks within a data band are recorded with a servo track by write heads of a write head array. Consequently, a servo track is formed concurrently with data tracks during write operations by the write head array. An exemplary servo pattern for the servo track is also described, although other types of servo patterns may be used so long as the array of write heads is used to define the servo pattern concurrently with data write operations. These and other embodiments are within the scope of the following claims.

The invention claimed is:

1. A method comprising:
writing a set of data tracks on a linear data storage medium using an array of write heads that perform data write operations in order to write data that defines the data tracks; and
recording a servo pattern on the linear data storage medium concurrently with writing the set of data tracks on the linear data storage medium using the array of write heads that perform the data write operations, wherein the servo pattern serves as a positional reference point relative to the set of data tracks.

2. The method of claim 1, wherein recording the servo pattern concurrently with writing the set of data tracks comprises recording the servo pattern such that the servo pattern is formed between data tracks of a data band.

3. The method of claim 1, wherein recording the servo pattern concurrently with writing the set of data tracks comprises recording the servo pattern on an outer edge of the set of data tracks of a data band.

4. The method of claim 1, wherein the servo pattern comprises a plurality of servo frames that include:
a set of first servo windows recorded at a first frequency; and
a set of second servo windows recorded at a second frequency,
wherein the first and second servo windows are arranged in a checkerboard-like pattern.

5. The method of claim 4, further comprising:
writing one of the first windows using a first head; and
writing one of the second windows adjacent the first window using a second head that is adjacent the first head.

6. The method of claim 5, further comprising:
writing a second one of the second windows using the first head; and
writing a second one of the first windows using the second head, wherein the first and second windows for a checkerboard-like configuration.

7. The method of claim 1, further comprising coarsely positioning the array of write heads based on a factory written servo pattern.

8. The method of claim 1, wherein a controller of the array of write heads defines a first subset of the write heads that write data and a second subset of the write heads that record the servo pattern.

9. The method of claim 1, wherein recording the servo pattern on the storage medium concurrently with writing the set of data tracks includes writing data in the servo pattern.

10. A linear data storage medium comprising:
a data band that includes a plurality of data tracks written during write operations by an array of write heads; and
a servo track formed within the data band, the servo track being formed by the array of write heads at the same time as the data tracks are written during the write operations such that the servo track corresponds to one or more tracks written by one of the heads in the array of write heads, wherein the servo track serves as a positional reference point relative to the set of data tracks, and wherein the servo track is formed by one or more heads in the array of write heads during the write operations by other heads in the array of write heads.

11. The linear data storage medium of claim 10, wherein the servo track defines a servo pattern comprising a plurality of servo frames that include:
a set of first servo windows recorded at a first frequency; and
a set of second servo windows recorded at a second frequency,
wherein the first and second servo windows are arranged in a checkerboard-like pattern.

12. The linear data storage medium of claim 10, further comprising a factory servo-pattern that provides for coarse positioning, wherein the servo track formed within the plurality of data tracks provides for fine positioning.

13. The linear data storage medium of claim 10, wherein the servo track is located between two of the data tracks, and wherein the servo track is defined by two adjacent write heads of the array.

14. The linear data storage medium of claim 10, wherein the servo track is located on an outermost edge the data tracks.

15. The linear data storage medium of claim 10, wherein the servo track comprises a first servo track, further comprising a second servo track formed within the data tracks.

16. A head array for writing a set of data tracks and a servo pattern to a magnetic tape, the array comprising:
a set of adjacent write heads; and
a controller to control the set of adjacent write heads to write the set of data tracks to the magnetic tape via data write operations and to concurrently write the servo pattern via one or more of the write heads, wherein the servo pattern serves as a positional reference point relative to the set of data tracks defined by the data write operations.

17. The head array of claim 16, wherein the one or more write heads used to write the servo pattern are formed between other ones of the write heads.

18. The head array of claim 16, wherein the one or more write heads used to write the servo pattern are formed on an outermost edge relative to other ones of the write heads.

19. The head array of claim 16, wherein the servo pattern comprises a plurality of servo frames that include:
a set of first servo windows recorded at a first frequency; and
a set of second servo windows recorded at a second frequency,
wherein the first and second servo windows are arranged in a checkerboard-like pattern on the magnetic tape.

20. The head array of claim 16, further comprising a set of read heads to read the data and the servo pattern written by the set of write heads, wherein the set of read heads includes:
a plurality of data read heads that read the data concurrently from a set of data tracks; and
a servo read head formed between the data read heads to read the servo pattern, wherein the servo read head is located between two adjacent tracks that define the servo pattern.

21. The head array of claim 16, further comprising a servo read head positioned a distance from the set of adjacent write heads to read a factory written servo pattern.

22. The head array of claim 16, wherein the controller controls the set of adjacent write heads to write die servo pattern within a band of data recorded in the data tracks.

* * * * *